United States Patent
Landes

[11] Patent Number: 5,701,704
[45] Date of Patent: Dec. 30, 1997

[54] DOCK DEVICE, PARTICULARLY FOR MAINTAINING AND OVERHAULING AIRCRAFT

[75] Inventor: Albert Landes, Reichenberg, Germany

[73] Assignee: Mero-Raustuktur GmbH & Co., Wurzburg, Germany

[21] Appl. No.: 465,984

[22] Filed: Jun. 6, 1995

[30] Foreign Application Priority Data

Jun. 13, 1994 [DE] Germany ............... 44 20 502.3

[51] Int. Cl.⁶ .................................................... E04B 1/346
[52] U.S. Cl. ............................. 52/64; 182/36; 182/150
[58] Field of Search ..................... 52/64, 29, 55, 52/111, 117, 123.1, 143; 182/36, 150; 414/560

[56] References Cited

U.S. PATENT DOCUMENTS

| 3,465,846 | 9/1969 | Jacobson | 182/36 |
| 5,423,396 | 6/1995 | Fahrion  | 182/36 |

*Primary Examiner*—Carl D. Friedman
*Assistant Examiner*—Creighton Smith
*Attorney, Agent, or Firm*—Laff, Whitesel, Conte & Saret, Ltd.

[57] ABSTRACT

Dock device (10), particularly for maintaining and overhauling commercial aircraft, having at least two lateral dock parts (28, 29) which are each connected by a suspension device (24, 25) to a supporting framework (23) so as to form a portal which is disposed on a supporting structure so as to be displaceable in the direction of the longitudinal axis of the aircraft, the lateral dock parts each having a movable bridge part (32, 33) such that, when the bridge parts are moved apart from one another, an area of passage (50) is cleared between the lateral dock parts and, when the bridge parts are moved towards one another, a bridge deck is created between the lateral dock parts.

8 Claims, 3 Drawing Sheets

DOCK DEVICE, PARTICULARLY FOR MAINTAINING AND OVERHAULING AIRCRAFT

The present invention relates to a dock device, particularly for maintaining and overhauling commercial aircraft, having at least two lateral dock parts.

BACKGROUND

To guarantee air safety, aircraft have to be maintained and overhauled at fixed intervals. For carrying out such work, especially on commercial aircraft, dock devices are required which enable the maintenance personnel or the personnel appointed to carry out an overhaul to reach all points of the aircraft at which such work has to be carried out. Since the fleets of the individual airlines comprise, at times, widely differing types of aircraft with correspondingly different configurations and dimensions, such dock devices are required to be extremely flexible.

Of the currently known dock devices, it is possible to distinguish two main types: on the one hand, platform scaffolds which are either supported on the ground or suspended from the aircraft hangar roof, extend along the fuselage of the aircraft and generally comprise two lateral dock parts which are each movable at right angles to the longitudinal axis of the aircraft; on the other hand, telescopic platforms which are suspended from the aircraft hangar roof and are movable triaxially relative to the fuselage of the aircraft. Both types have proved in practice to have considerable drawbacks. The scaffold platforms have the drawback that, independently of the special maintenance or overhauling work to be carried out, costly scaffolding around the entire aircraft is required. Moreover, scaffold platforms generally have scaffold regions which bridge the fuselage of the aircraft and prevent or at least considerably impede the tail-in dock entry method preferred by some airlines, whereby the aircraft is manoeuvred tail first into the maintenance dock.

The telescopic platform, being extremely mobile, does in fact allow any dock entry method to be selected but telescopic platforms, because of their complex design, are very expensive to purchase and, like suspended scaffold platforms, require hangar roof supporting structures with an extremely high loading capacity.

SUMMARY OF THE INVENTION

The object of the present invention is to provide a dock device which affords a high degree of flexibility as regards the choice of dock entry method and the accessibility of selected points of the aircraft structure, is relatively lightweight and reduces to a minimum the extent to which scaffolding has to be erected around the aircraft.

To achieve said object, the dock device according to the invention has the features of claim 1.

The dock device according to the invention is provided with lateral dock parts which are displaceable in the direction of the longitudinal axis of the aircraft and have movable bridge parts such that, when the bridge parts are moved apart from one another, an area of passage is cleared between the lateral dock parts and, when the bridge parts are moved towards one another, a bridge deck is created between the lateral dock parts.

Because the lateral dock parts are displaceable in the direction of the longitudinal axis of the aircraft, the lateral dock parts do not have to be a continuous construction extending over the length of the aircraft. As a result, a considerable reduction in the dead weight of the dock device may be achieved, thereby allowing said dock device to be mounted also on hangar roof structures with a lower loading capacity.

By virtue of the lateral dock parts being longitudinally displaceable, said parts may themselves by of a relatively compact construction so that, combined with the dock device according to the invention, further devices may be moved directly up against the aircraft fuselage without causing disadvantageous mutual interference. It therefore becomes possible simultaneously to carry out different maintenance tasks which, with a conventional dock construction, may only be carried out successively. This affords the opportunity of a substantial reduction in maintenance times.

By constructing the lateral dock parts with bridge parts which are movable relative thereto, there is no need for the suspension devices to be transversely displaceable relative to the aircraft fuselage and so there is no need for corresponding rails or driving structures on the hangar roof. Rather, simply by moving the bridge parts apart from one another, an area of passage, such as is required, for example, with the tail-in dock entry method to allow the tail unit of the aircraft to pass through, may be cleared in the region of the lateral dock parts. The bridge parts have a low mass compared to the remaining structure so that suitable devices for displacing the bridge parts may be of a relatively lightweight construction.

In a preferred embodiment of the dock device, the lateral dock parts are vertically displaceable relative to the suspension devices. It is therefore possible for the lateral dock parts to be adapted in terms of operating height to the fuselage of the aircraft, as may be the case, for example, with aircraft which are standing on the ground or are jacked up.

The lateral dock parts may moreover be laterally displaceable relative to the suspension devices, thereby making it easy for the dock device to be adapted to the transverse dimensions of the fuselage of different types of aircraft.

When the lateral dock parts have at least one projecting cantilever platform, it is possible to adjust a working position for the maintenance personnel which extends right up against the aircraft body, in extreme cases up to contact therewith.

When the cantilever platform is designed to be movable in and out relative to the lateral dock parts, it becomes easily possible for the working position for the maintenance personnel to be adapted to the individual fuselage shape.

It is particularly advantageous if a lifting device in the form of, for example, a davit disposed on the supporting framework is associated with each lateral dock part since this provides a working aid disposed directly on the lateral dock parts to help the maintenance personnel, say, to move heavy aircraft components in the fuselage region.

BRIEF DESCRIPTION OF THE DRAWINGS

A preferred embodiment of the dock device according to the invention is described below with reference to the drawings. The drawings show.

DETAILED DESCRIPTION OF THE PREFERRED EMBODIMENT

Figure 1:
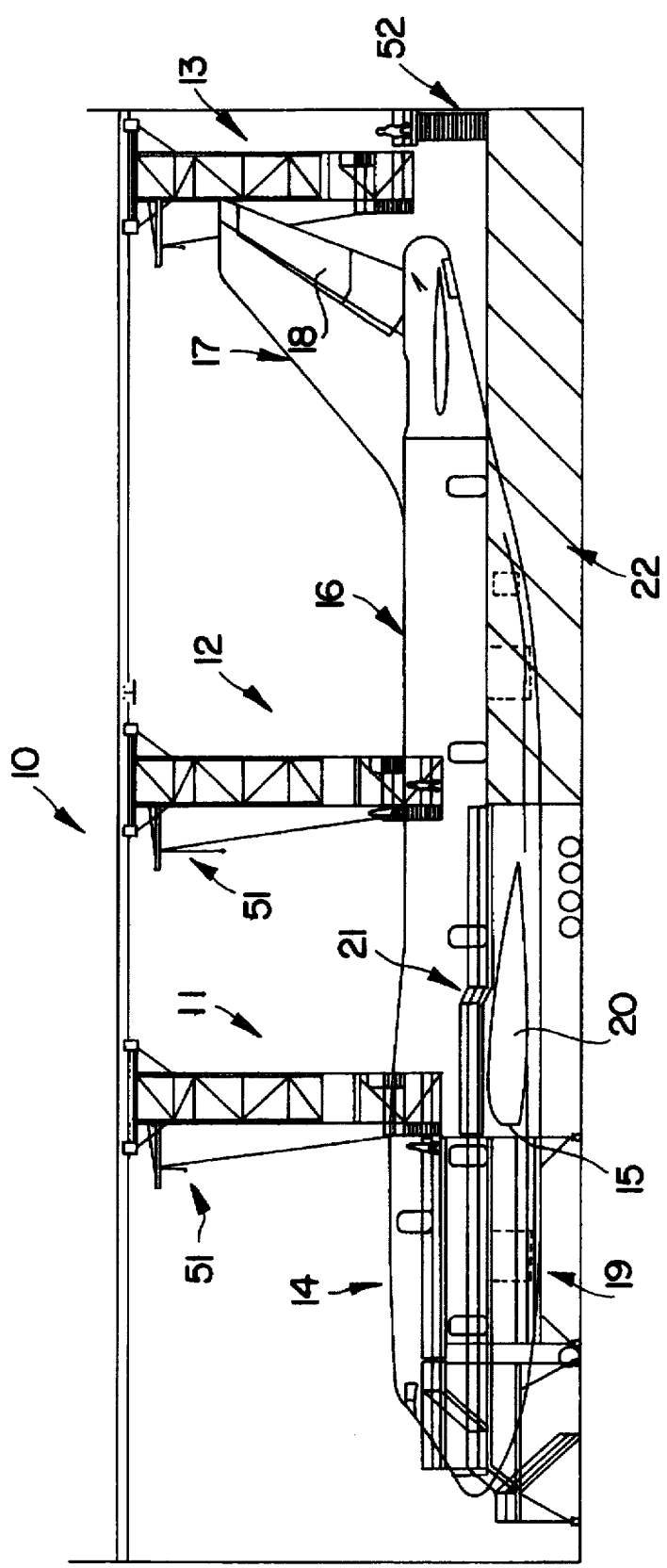
FIG. 1 an embodiment of the dock device as part of a maintenance dock, using the example of a Boeing B-747-400 disposed in the maintenance dock.

FIG. 1 is a side view of a maintenance dock 10 for a Boeing B-747-400, in which a total of three dock devices 11, 12 and 13 are used. The first dock device 11 is situated in the front fuselage region 14 above a leading edge 15 of a wing 20, the second dock device 12 is situated in the rear fuselage region 16 and the third dock device 13 is situated in the region of a rudder unit 17 directly behind a vertical rudder 18.

Figure 2:
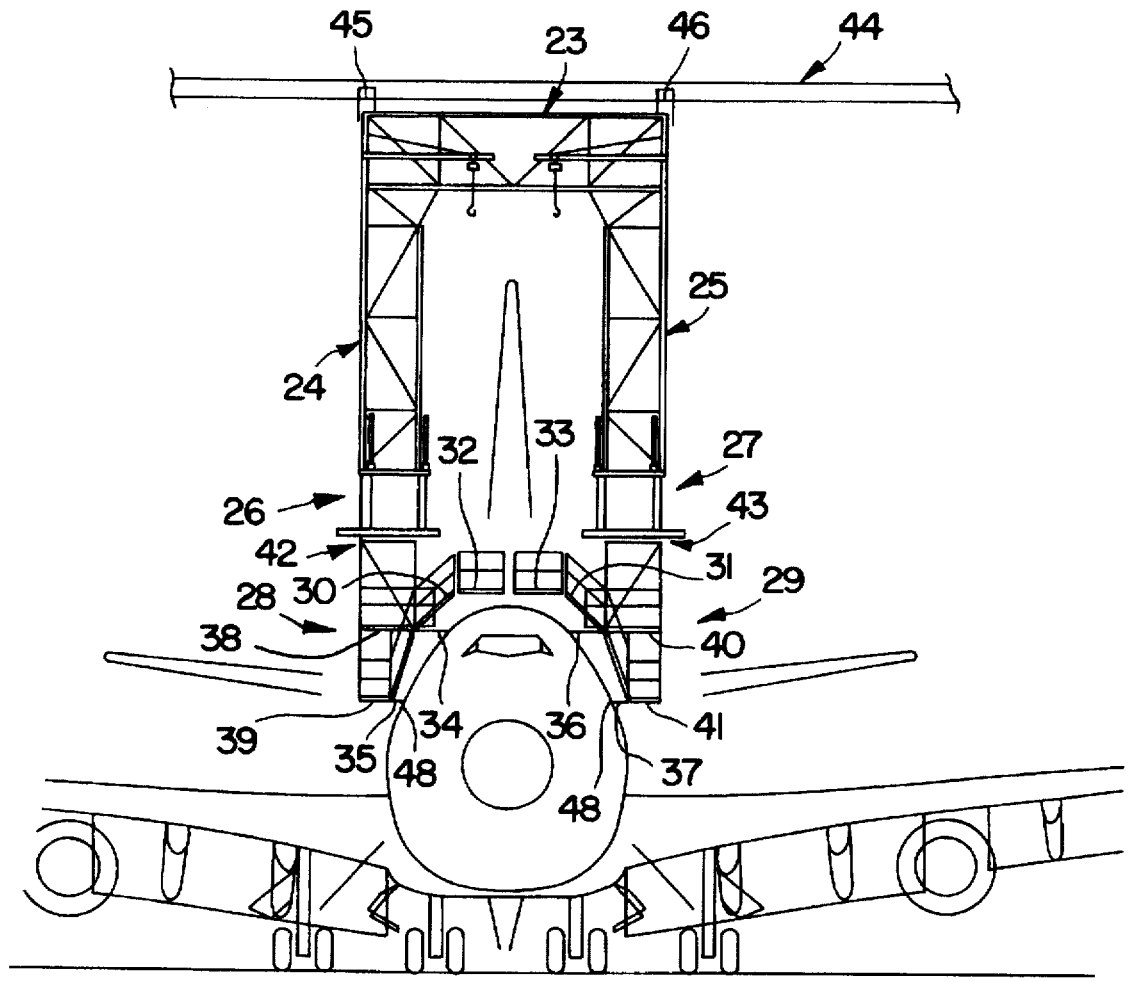
FIG. 2 a detail view of a dock device disposed in the region of the front fuselage of the aircraft.

The dock devices 11, 12 and 13 are supplemented in the front fuselage region 16 by ground-supported lateral fuselage scaffolds 19, in the region of the wing 20 by wing bridges 21 and in the rear fuselage region 16 by maintenance platforms 22 on either side of the aircraft fuselage shown in FIG. 2 to form the maintenance dock 10. Additionally situated behind the tail of the aircraft is a ground-supported stairway 52 affording access to the rear dock device 13.

There follows a detailed description of the structure of the identically constructed dock devices 11, 12 and 13 with reference to the dock device 11. The dock device 11 comprises two suspension devices 24, 25, which are connected to a supporting framework 23 and at their bottom ends are each connected by a lifting device 26 or 27 to a lateral dock part 28 or 29. The lateral dock parts 28, 29 each comprise a ramp part 30, 31 provided in each case with a bridge part 32, 33, which is movable at right angles to the longitudinal axis of the aircraft. The movement of the ramp parts 30, 31 relative to the longitudinal axis of the aircraft may be effected both translationally and by a swivelling motion, e.g. by upward folding. Furthermore, in the present embodiment the bridge parts 32, 33 are in addition capable of swivelling relative to the ramp parts 30, 31.

Each lateral dock part 28 or 29 further comprises two sliding platforms 34, 35 or 36, 37, which are connected in each case to a base platform 38, 39 and 40, 41 of the lateral dock parts 28, 29 and are displaceable relative thereto at right angles to the longitudinal axis of the aircraft. In order to enable the lateral dock parts 28, 29 as a whole to be transversely displaceable relative to the longitudinal axis of the aircraft, in the presently illustrated embodiment the lifting devices 26, 27 are combined with a transverse displacement device 42 and 43 respectively.

In order, besides the positions of the dock devices 11, 12, 13 shown in FIG. 1, to enable any desired intermediate positions along the longitudinal axis of the aircraft, the supporting framework 23 is guided on support rails 45, 46 connected to a roof-supporting structure 44 and is displaceable along said rails by means of a drive device which is not shown in detail.

FIG. 2 shows the dock device 11 with the bridge parts 32, 33 moved towards one another and with the cantilever platforms 34, 35, 36 and 37 extended out towards the fuselage of the aircraft, thereby providing easy access from the lateral dock parts 28, 29 to the upper fuselage region. To prevent the skin of the aircraft from being damaged by the extended sliding platforms 34, 35, 36 and 37, the latter are provided at their outer ends with padding 48.

Figure 3:
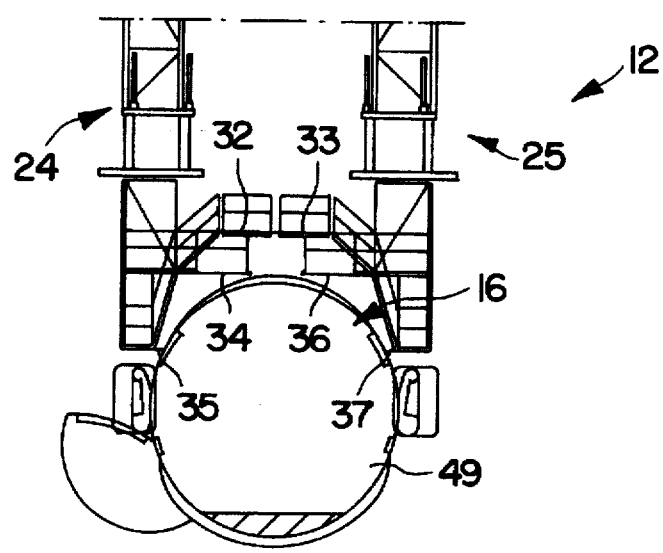
FIG. 3 a dock device in the region of the rear fuselage of the aircraft.

Compared to FIG. 2, FIG. 3 shows the dock device 12 in the rear fuselage region 16 above a fuselage cross-section 49. From a comparison of the configurations of the dock devices 11 and 12 it is clear that the ability of the sliding platforms 34 to 37 to slide outwards allows easy adaptation to the contour of the aircraft fuselage in the rear fuselage region 16 which differs from that in the front fuselage region 14.

Figure 4:
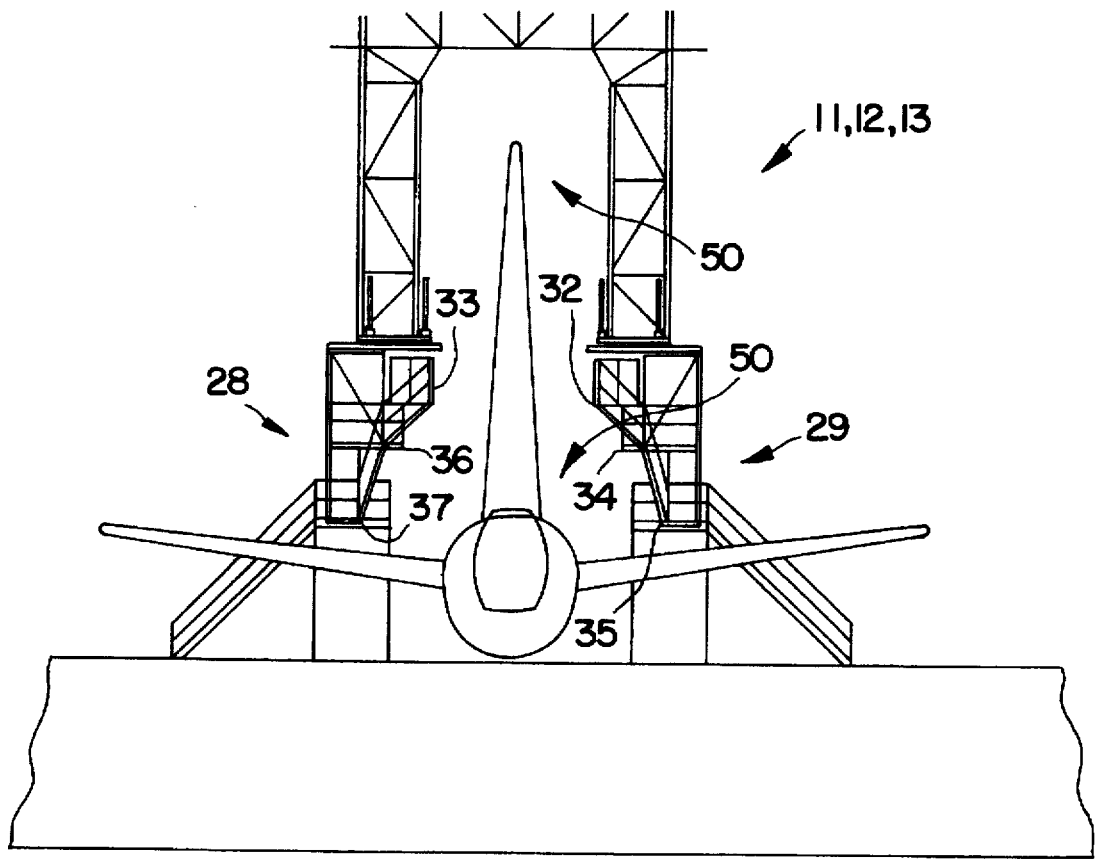
FIG. 4 a dock device in dock entry position for the tail-in dock entry method.

FIG. 4 shows a dock device 11, 12 or 13 in dock entry position when implementing a tail-in dock entry method. In said position, the bridge parts 32, 33 and the sliding platforms 34 to 37 are in their position of retraction into the lateral dock parts 28, 29 in order to clear an area of passage 50 for the tail unit. After the tail unit has passed through, the bridge parts 32, 33 may then be moved back into the position shown in FIGS. 2 and 3, in which they have been moved towards one another, and the sliding platforms 34 to 37 may be moved back against the aircraft fuselage.

Owing to the displaceability of the bridge parts 32, 33, which may be effected translationally as well as, for example, by a swivelling motion, and the portal-like construction of the supporting structure 23, 24, 25, the area of passage 50 may be cleared despite the exclusively uniaxial displaceability of the entire dock device 11, 12 or 13 along the support rails 45, 46 in the direction of the longitudinal axis of the aircraft. As a result, the support rail arrangement loading the roof-supporting structure 44 remains restricted to a minimum.

As FIG. 1 clearly reveals, the longitudinal displaceability of the individual dock devices 11, 12, 13 is sufficient to allow said devices to be supplemented by the further dock devices 19, 21 and 22 to form a maintenance dock 10 which affords access to all regions of the aircraft despite minimal scaffolding around the aircraft. Particularly because of the longitudinal displaceability of the individual dock devices 11, 12, 13 and the bridge parts 32, 33 being movable relative to the lateral dock parts 28, 29, the dock devices may be used at any point along the aircraft fuselage instead of continuous scaffolding, such as is the case with the known scaffold platforms. It is particularly advantageous if a lifting device 51 in the form of, for example, a davit disposed on the supporting framework is associated with each lateral dock part since this provides a working aid disposed directly on the lateral dock parts to help the maintenance personnel to, for example, move heavy aircraft components in the fuselage region.

As is evident particularly from the view according to FIG. 1, it is possible during the dock process for the wing bridge 21 to be taken up by means of the dock devices 11, 12 and lifted by means of the lifting devices 26, 27 high enough for the horizontal tail unit to pass through below it. The use of an additional crane is thereby avoided. A further advantage of said handling of the wing bridge 21 is that, because of the sure guidance of the dock device compared to the lability of crane cable guidance, striking of the wing bridge 21 against the fuselage of the aircraft is at all costs avoided.

The claimed invention is:

1. Dock device for maintaining and overhauling a commercial aircraft having a longitudinal axis, said dock device comprising at least two lateral dock parts spaced from one another to form an area of passage for an aircraft, each lateral dock part being connected by a suspension device to a supporting framework installed above the area of passage so as to form a supporting portal structure which, is positioned in the area of passage, is displaceable in the direction of the longitudinal axis of the aircraft, the lateral dock parts each having a moveable bridge part such that, when the bridge parts are moved apart from one another, the area of passage is cleared between the lateral dock parts and, when the bridge parts are moved toward one another, a bridge deck is created between the lateral dock parts.

2. Dock device according to claim 1, further comprising at least one lifting device for vertically displacing the lateral dock parts relative to the suspension devices.

3. Dock device according to claim 1 or 2, further comprising at least one transverse displacement device for transversely displacing the lateral dock parts relative to the suspension devices.

4. Dock device according to claim 3, wherein the lateral dock parts have at least one projecting sliding platform.

5. Dock device according to claim 4, further comprising a base platform of the lateral dock parts connected and displaceable relative to the sliding platform.

6. Dock device according to claim 5 further comprising a lifting device associated with each lateral dock part.

7. Dock device according to claim 6, wherein the bridge parts are hinged upwards.

8. Dock device according to claim 6, wherein the lifting device comprises a davit.

* * * * *